（12）United States Patent
Mizukawa et al.

(10) Patent No.: US 11,207,728 B2
(45) Date of Patent: Dec. 28, 2021

(54) SELF-PIERCING RIVET FASTENING DEVICE

(71) Applicant: NEWFREY LLC, New Britain, CT (US)

(72) Inventors: Noriko Mizukawa, Toyohashi (JP); Hiroyo Makino, Toyohashi (JP); Daisuke Miura, Toyohashi (JP)

(73) Assignee: NEWFREY LLC, New Britain, CT (US)

(*) Notice: Subject to any disclaimer, the term of this patent is extended or adjusted under 35 U.S.C. 154(b) by 0 days.

(21) Appl. No.: 17/178,753

(22) Filed: Feb. 18, 2021

(65) Prior Publication Data

US 2021/0252585 A1 Aug. 19, 2021

(30) Foreign Application Priority Data

Feb. 19, 2020 (JP) .............................. JP2020-026325

(51) Int. Cl.
*B21J 15/32* (2006.01)
*B21J 15/02* (2006.01)
(Continued)

(52) U.S. Cl.
CPC .............. *B21J 15/32* (2013.01); *B21J 15/025* (2013.01); *B21J 15/10* (2013.01); *B23P 19/006* (2013.01); *B23B 2231/2091* (2013.01)

(58) Field of Classification Search
CPC .......... B21J 15/10; B21J 15/025; B21J 15/32; B23P 19/002; B23P 19/005; B23P 19/006;
(Continued)

(56) References Cited

U.S. PATENT DOCUMENTS 579,265 A * 3/1897 Gulick .................... B23B 31/20
279/49
3,495,844 A * 2/1970 Dee ......................... A61C 1/144
279/35
(Continued)

FOREIGN PATENT DOCUMENTS

DE 3344232 A1 6/1985
DE 102008051488 A1 4/2010
(Continued)

OTHER PUBLICATIONS

EP Search Report Dated Jul. 19, 2021 cited in Corresponding EP Application No. 21157641.8.

*Primary Examiner* — Matthew P Travers
(74) *Attorney, Agent, or Firm* — Michael P. Leary (57) ABSTRACT

A collet to feed and fasten cylindrical rivets includes an inlet unit that accepts and supports the rivet, a first feeding unit connected from the inlet unit and configured to feed the rivet, a second feeding unit connected to the first feeding unit opposite to the inlet unit and configured to feed the rivet, and an outlet unit that is connected to the second feeding unit opposite to the first feeding unit and supports the rivet that is fed to it. The inlet unit and the first feeding unit have at least two first slots at opposite angles, the second feeding unit and the outlet unit have more of second slots than the first slots, and when the rivet enters the first feeding unit, the second slots are closed by the opening of the first slots.

18 Claims, 5 Drawing Sheets

(51) Int. Cl.
B23P 19/00 (2006.01)
B21J 15/10 (2006.01)

(58) Field of Classification Search
CPC .............. B23B 31/20; B23B 2231/20; B23B 2231/2043; B23B 2231/2089–2091; B23B 2231/2097
See application file for complete search history.

(56) References Cited

U.S. PATENT DOCUMENTS

| | | | | |
|---|---|---|---|---|
| 3,671,050 | A * | 6/1972 | Andersson | B23B 31/20 279/47 |
| 5,405,220 | A * | 4/1995 | Ishikawa | B23B 31/202 279/20 |
| 5,813,114 | A | 9/1998 | Blacket et al. | |
| 6,158,934 | A | 12/2000 | Wieland | |
| 6,968,939 | B1 | 11/2005 | Mauer | |
| 8,777,080 | B2 | 7/2014 | Draht et al. | |
| 8,857,132 | B2 | 10/2014 | Zimmer et al. | |
| 2006/0290077 | A1* | 12/2006 | Tanga | B23B 31/201 279/52 |
| 2010/0171275 | A1* | 7/2010 | Nguyen | B23B 31/20 279/4.09 |
| 2011/0146456 | A1* | 6/2011 | Hain | B65G 51/02 81/55 |
| 2013/0019457 | A1* | 1/2013 | Moeser | B21J 15/32 29/525.06 |
| 2018/0009041 | A1* | 1/2018 | Chen | B23B 31/202 |
| 2018/0347701 | A1* | 12/2018 | Bookheimer | B23B 31/202 |
| 2020/0086398 | A1* | 3/2020 | Chen | B23B 31/201 |

FOREIGN PATENT DOCUMENTS

| | | |
|---|---|---|
| EP | 2174019 B1 | 3/2011 |
| JP | 4355380 B | 10/2009 |
| WO | 2019110992 A1 | 6/2019 |

* cited by examiner

SELF-PIERCING RIVET FASTENING DEVICE

CROSS-REFERENCE TO RELATED APPLICATIONS

This application claims priority from Japanese Patent Application No. 2020-026325, filed on Feb. 19, 2020 the entire disclosure of which is incorporated herein by reference.

BACKGROUND OF THE PRESENT INVENTION

The present disclosure relates to a device for feeding and fastening a self-piercing rivet (SPR), and particularly to a collet for feeding and fastening an SPR.

In recent years, a technique for mechanically joining a base metal using SPR has been used as an alternative technique to a direct joining technique such as spot welding. An SPR is a semi-cylindrical rivet having a chevron or dish-shaped head and semi-cylindrical legs forming a cavity beneath the head. The SPR is driven by the following procedure. First, the upper plate (for example, an aluminum plate) and the lower plate (for example, a high-strength steel plate) to be joined are clamped by the die and the nose piece of the fastening device. When the SPR provided in the nose piece is punched, the legs of the SPR pierce and penetrate the upper plate. When the legs of the SPR penetrating the upper plate enter the lower plate and the lower surface of the lower plate comes into contact with the bottom of the die, the bottom of the die cavity pushes back the lower plate. As a result, the legs of the SPR receive a reaction force from the lower plate and open the legs in a ring shape in the lower plate without penetrating the lower plate. A mechanical interlock is formed by opening the legs of the SPR, and the upper plate and the lower plate are mechanically joined. The die and nose piece separate from the member to be joined and the joining is completed.

As shown in Japanese Patent No. 4,355,380, a conventional collet that is arranged in the nose piece and feeds SPR is fixed by aligning two collets on the left and right in an arc shape and attaching an O-ring to the outlet. The collet is tapered from the entrance to the exit so that the inner diameter becomes elliptical when the two left and right collets are combined. When a perfect circle rivet passes through the combined collet. because the O-ring extends to the rivet flange diameter and opens, in the case of a short SPR (SPR whose shaft length is shorter than the flange diameter) of 5 mm or less due to a large gap between the two sheets, a space for inversion is created. Further, an expansion load is applied to the O-ring, and after a certain number of uses, the O-ring is torn and broken at the edge of the mounting groove of the O-ring. Since the collet is stored in the nose piece during the operation of the SPR, it is difficult to notice that the O-ring has broken, and if it is used as it is, the rivet cannot be held in the collet and it will be inverted.

Patent Document 1 Japanese Patent No. 4,355,380.

SUMMARY OF THE INVENTION

Therefore, an object of the present invention is to provide a rivet fastening device that prevents the inversion of a short SPR and is resistant to tearing.

To achieve this object, one aspect of the invention is a cylindrical rivet fastening device used to feed and fasten rivets, equipped with an inlet unit that accepts and supports the rivet, a first feeding unit connected from the inlet unit and configured to feed the rivet, a second feeding unit connected to the first feeding unit on the side opposite to the inlet unit and configured to feed the rivet, and an outlet unit that is connected to the second feeding unit on the side opposite to the first feeding unit and supports the rivet that is fed from the second feeding unit; wherein the rivet fastening device is configured so that the inlet unit and the first feeding unit have at least two first slots at opposite angles, the second feeding unit and the outlet unit have a larger number of second slots than the slots of the inlet unit and the first feeding unit, and when the rivet is fed from the inlet unit and enters the first feeding unit, the second slots are closed by the opening of the first slots.

In the rivet fastening device, the first slots preferably extend to the second feeding unit.

In the rivet fastening device, the wall thickness of the second feeding unit is preferably thinner than the wall thickness of the first feeding unit.

In the rivet fastening device, the wall thickness of the outlet unit is preferably made thicker than the wall thickness of the second feeding unit.

In the rivet fastening device, the length of the second slots is preferably made longer than the length of the first slots.

In the rivet fastening device, the number of the first slots is preferably two, and the number of the second slots is six.

In the rivet fastening device, the inlet unit has preferably a narrower slot width than the first feed portion, and the outlet unit has a narrower slot width than the second feed portion.

In the rivet fastening device, the inlet unit, the first feeding portion, the second feeding portion and the outlet unit are preferably integrally formed.

Another aspect of the present invention is a case wherein the rivet fastening device is arranged inside; when the rivet reaches the outlet unit, the second slot of the outlet unit is configured to spread outward in the radial direction and abut the inner surface of the case.

According to the present invention, it is possible to provide a rivet fastening device that prevents inversion and is less likely to be torn when a short SPR is fed.

DESCRIPTION OF THE PREFERRED EMBODIMENTS

Hereinafter, embodiments for carrying out the present invention will be described with reference to the accompanying drawings. By assigning the same or similar reference numbers to the same or similar members, duplicate description will be omitted. In order to explain the present invention in an easily understandable manner, the scale of the drawings is not consistent.

The configuration of the system 10 for feeding and fastening rivets will be described with reference to FIGS. 1 and 2.

Figure 1:
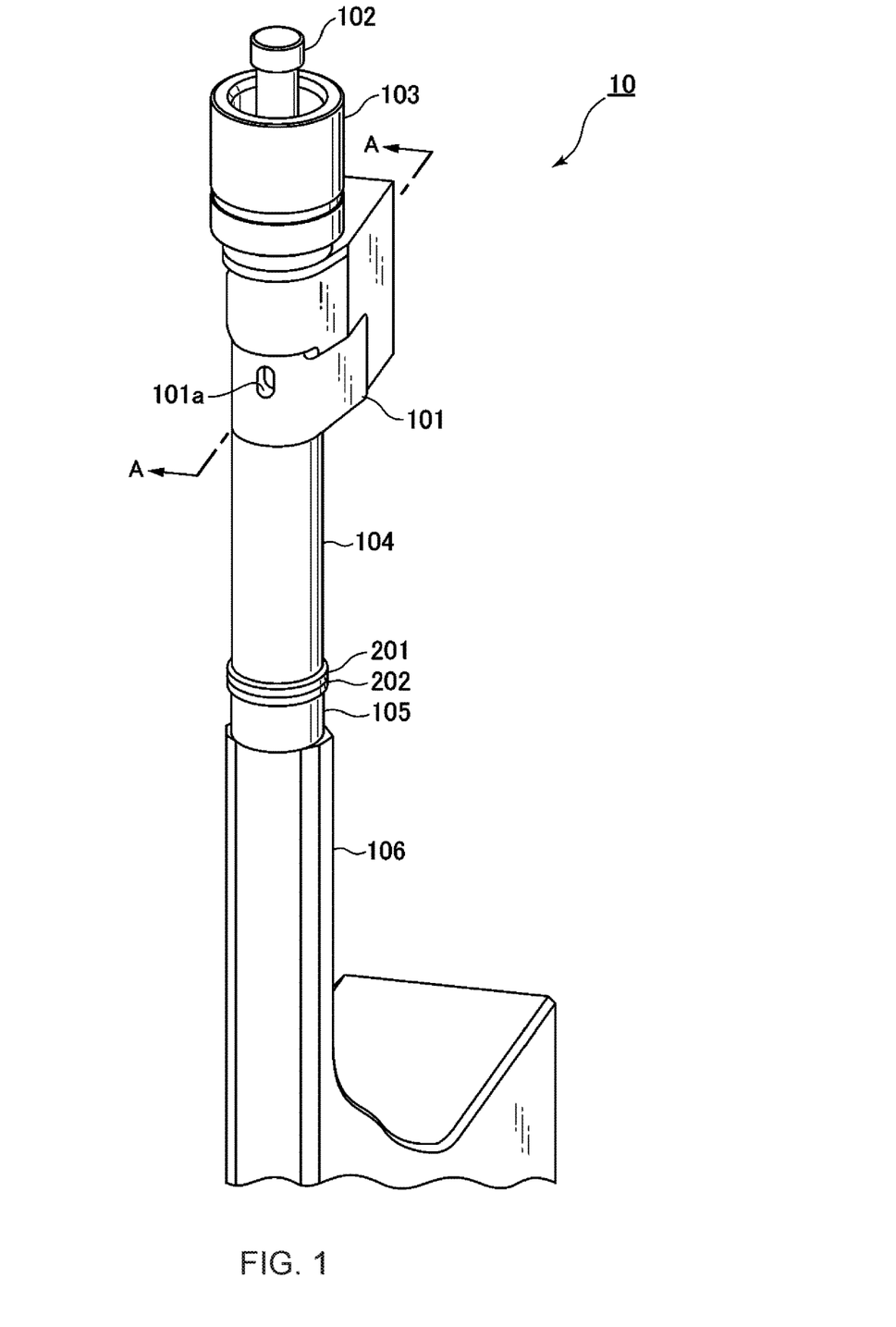
FIG. 1 is a diagram showing a configuration of a system 10 for feeding and fastening rivets.
Figure 2:
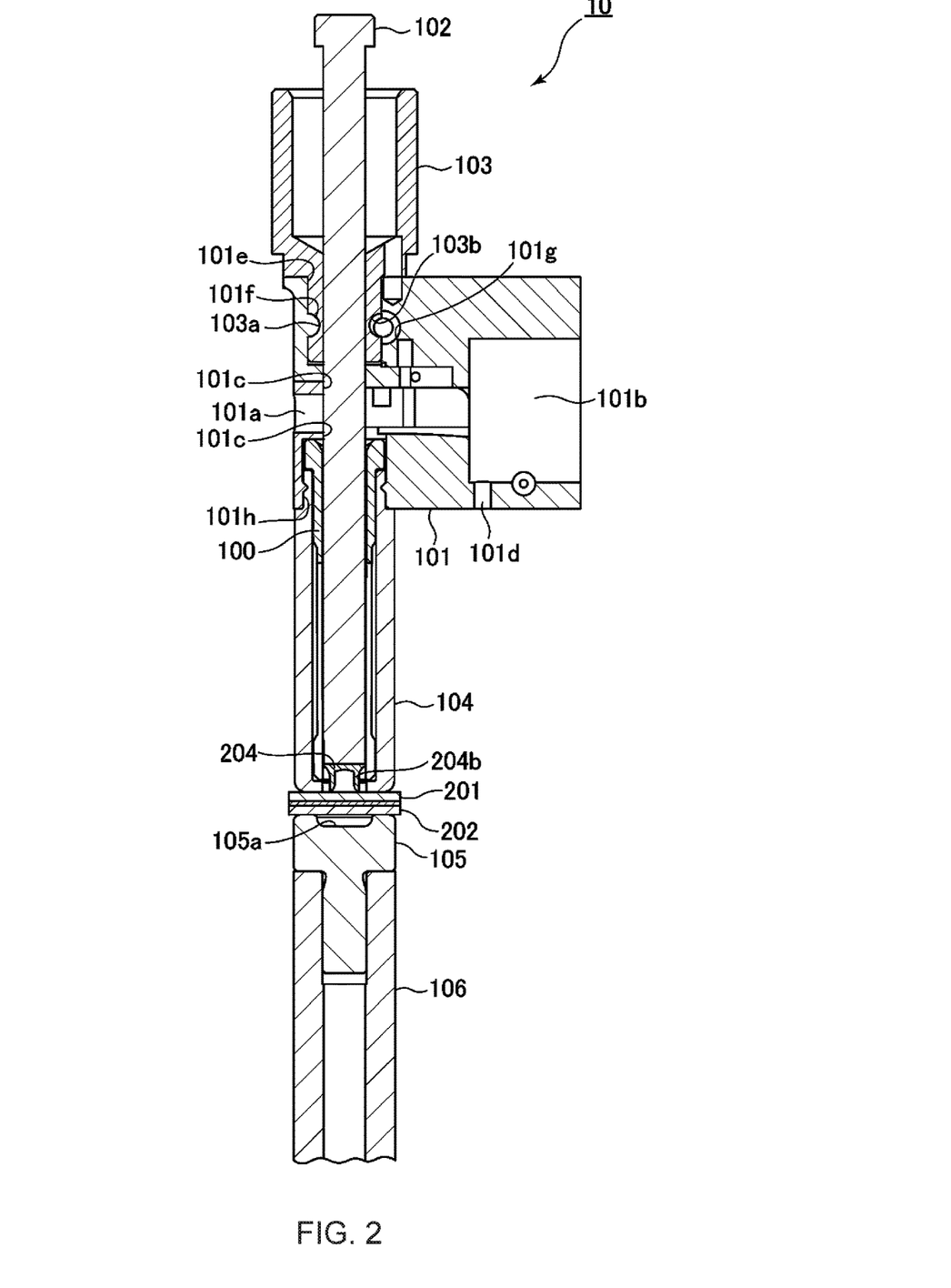
FIG. 2 is a diagram showing a cross section taken along the line A-A of the system 10 for feeding and fastening the rivet of FIG. 1.

FIG. 1 is a partial perspective view of a portion where a member to be fastened is held by a system 10 for feeding and fastening rivets, and FIG. 2 is a cross-section view taken along line A-A of FIG. 1.

As shown in FIG. 1, the system 10 has a receiver 101 that receives self-piercing rivets (SPR) supplied one by one from a rivet feeder, a punch 102 for driving the supplied SPR, a punch holder 103 that slidably holds the punch 102, a nose piece 104 that protects the linear motion when the punch 102 is driven, a die 105 that comes into contact with a part of the member to be fastened, and a C frame 106 for holding the die 105, one end of which is connected to the die 105. Although not shown in the figure, the other end of the C frame 106 takes a structure for holding a housing (not shown) for accommodating the punch holder 103.

As shown in FIG. 2, the receiver 101 has a passage 101b through which the SPR supplied from the rivet feeder passes, and rivet passage prevention wall 101c for stopping the advance of the SPR passing through the passage 101b. The rivet feeder feeds SPR by utilizing the air pressure of compressed air, and the receiver 101 is provided with exhaust ports 101a and 101d for letting the compressed air escape. A concave unit 101e is formed in the upper part of the receiver 101, and the tip of the punch holder 103 is fitted in the concave unit 101e. The receiver 101 has a convex unit 101f on a part of the wall surface forming the concave unit 101e so as to protrude into the concave unit 101e, and a through groove 101g formed so as to be recessed from the concave unit 101e on the wall surface opposite to the convex unit 101f. A concave unit 101h is formed in the lower part of the receiver 101, and a nose piece 104 is press-fitted into the concave unit 101h with a collet 100 inserted into the nose piece 104.

The punch holder 103 holds the punch 102 slidably. Although not shown, a housing that houses the punch holder 103 is held by one end of the C frame 106. At the tip of the punch holder 103 is formed a concave groove 103a formed to match the shape of the convex unit 101f of the receiver 101, and a through groove 103b formed so as to face the through groove 101g of the receiver 101 when the punch holder 103 and the receiver 101 are fitted. The concave groove 103a extends the tip end portion of the punch holder 103 in the circumferential direction, for example, ¼ turn, and further extends in the axial direction toward the tip end portion of the punch holder 103. The convex unit 101f of the receiver 101 is guided from the groove at the tip of the punch holder 103, slides along the axial direction, and is further rotated in the circumferential direction, so as to obtain the state shown in FIG. 2. The through groove 101g of the receiver 101 and the through groove 103b of the punch holder 103 are opposed to each other to integrally form a through hole. The punch holder 103 and the receiver 101 are fixed by inserting a rod-shaped lock member (not shown) into the through hole.

The punch 102 is a rod-shaped member for driving the supplied SPR 204 into the members to be coupled 201 and 202. When the SPR204 is delivered to the point where it comes into contact with the rivet passage prevention wall 101c and is held by the rivet passage prevention wall 101c and the rivet holding member by a spring or the like (not shown), the punch 102 drives the SPR204 into the members to be coupled 201 and 202. The driving operation of the punch 102 is performed by a rivet driving device.

As shown in FIG. 2, the nose piece 104 is attached to the receiver 101 by press-fitting its root portion into the concave unit 101h of the receiver 101. The inside of the nose piece 104 is hollow to house the collet 100; the nose piece 104 is press-fitted into the concave unit 101h of the receiver 101 with the collet 100 inserted into the cavity of the nose piece 104. The tip of the nose piece 104 abuts the upper plate 201 and clamps the upper plate 201 and the lower plate 202 together with the die 105.

The receiver 101, the punch holder 103, and the nose piece 104 can integrally move linearly along the axial direction of the nose piece 104 by a driving means (not shown) such as a compression coil spring.

The die 105 is a member that supports the upper plate 201 and the lower plate 202. The die 105 has a cavity 105a at its head having a diameter larger than the outer diameter of the leg unit 204b of the SPR 204 so that the leg unit 204b can be opened when the SPR 204 is driven.

One end of the C frame 106 holds the die 105, as shown in FIG. 2. The other end of the C frame 106 is fixed to a housing (not shown) that houses the punch holder 103. Since a strong force of 20 to 100 kN is typically applied to the SPR when driving the SPR, the C frame 106 is made of a material having rigidity so that the alignment does not collapse even when such a strong force is applied.

Figure 3:
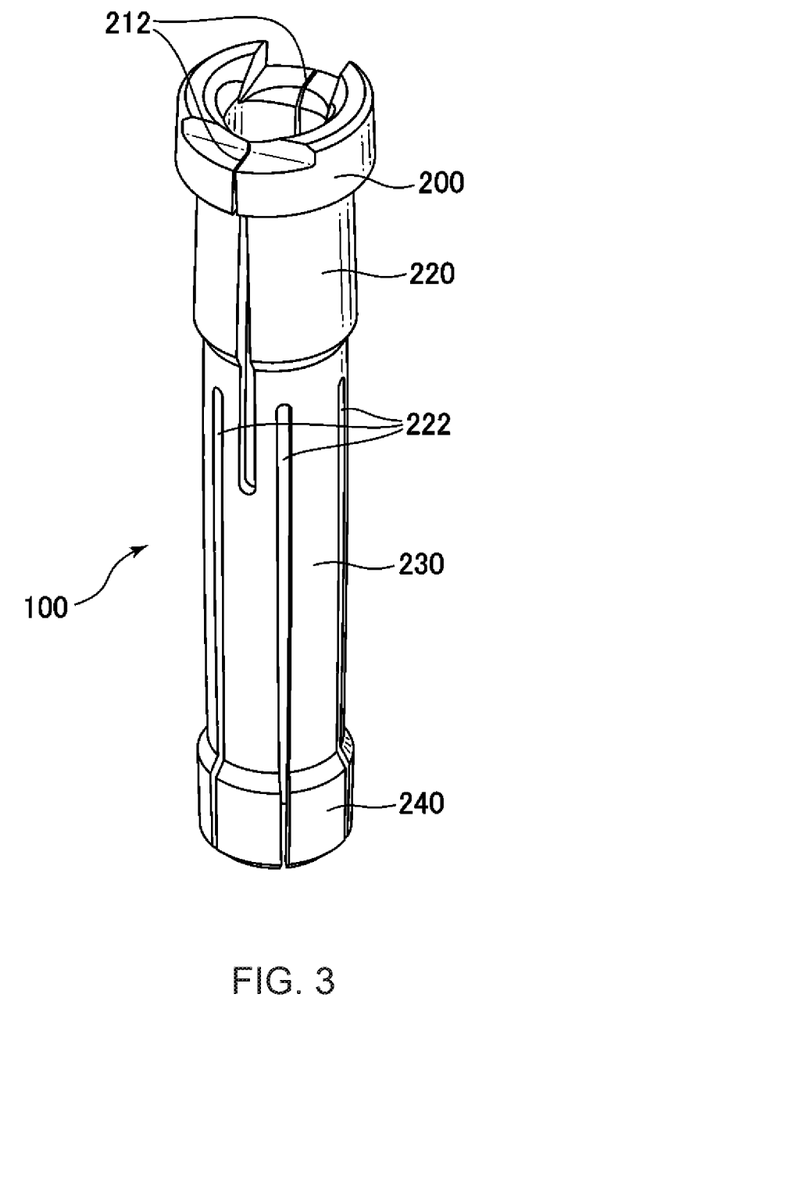
FIG. 3 is a diagram showing a configuration of a collet 100 according to an embodiment of the present invention.
Figure 4:
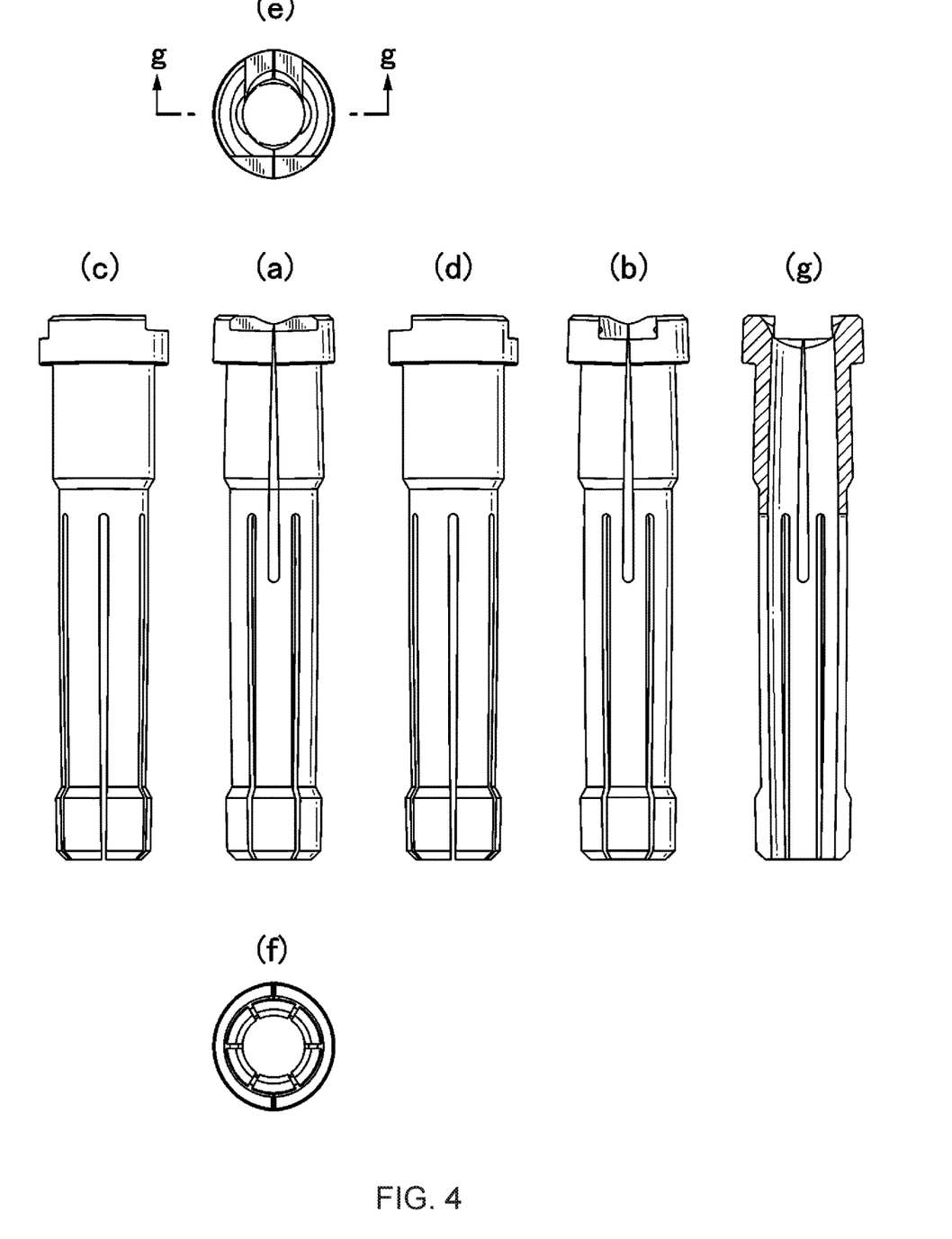
FIG. 4 is a diagram, respectively showing a front view (a), a rear view (b), a left side view (c), a right side view (d), a plan view (e), a bottom view (f), and a cross section view along the line g-g (g).

FIG. 3 is a perspective view showing the configuration of a rivet fastening device (collet 100) according to an embodiment of the present invention. FIG. 4 respectively shows a front view (a), a rear view (b), a left side view (c), a right side view (d), a plan view (e), a bottom view (f), and a g-g line cross section view (g) of the collet 100.

The collet 100 take an overall cylindrical shape; it has an inlet unit 200, a first feed unit 220, a second feed unit 230, and an outlet unit 240 in order from the upstream side to which the SPR is fed, and these can be formed by integral molding.

The inlet unit 200 and the first feeding unit 220 have two diagonally contained slots 212. As shown in FIG. 3, the slots 212 may extend to a part of the second feeding unit 230 on the first feeding unit 220 side. An example of the slots 212 has a length of 30 mm and a width of 1.2 mm. Further, the portion of the inlet unit 200 containing the slots 212 is drawn, the slot width is reduced, and the rivet inlet diameter in the cross section is formed in an elliptical shape. Moreover, the slots 212 are provided in the long axis direction of the ellipse, whereby the inlet unit 200 is separated into two. The length of this elliptical minor axis is smaller than the diameter of the SPR flange; the SPR can be held by the inlet unit 200 and is configured so as not to fall into the collet 100. Further, the opening shape of the inlet unit 200 is a shape in which the flange portion of the SPR is fitted; the SPR received from the receiver 101 takes a structure so as to avoid creating a space for the SPR to be inverted at the inlet unit 200.

When the SPR held by the inlet unit 200 is pressured by the punch 102 in the cylindrical axial direction of the collet 100, the gap between the two pieces of the slots 212 becomes large, and the opening of the inlet unit 200 expands from the elliptical shape to the short axis direction. Then, by expanding the inner diameter of the inlet unit 200 in the minor axis direction to the flange diameter of the SPR, the flange portion of the SPR can pass in the axial direction along the inner diameter of the inlet unit 200.

The first feeding unit 220 is connected to the inlet unit 200 on the downstream side in the direction in which the SPR flows and feeds the SPR inserted from the inlet unit 200. In the first feeding unit 220, the portion on the inlet unit 200 side is drawn. When the slot 212 at the inlet unit 200 opens and the SPR passes through, the inner diameter of the first feeding portion 220 connected to the inlet unit 200 is configured to expand in conjunction therewith, and in the SPR, the flange portion passes along the inner surface of the first feeding portion 220.

The second feeding unit 230 is connected to the first feeding unit 220 on the side opposite to the inlet unit 200 and feeds the SPR to the outlet unit 240. The second feeding unit 230 has a slot 222 connected from the outlet unit 240 side in six cylinders; it has a shape of 6 claws, and in one example, the length of the slot is 39 mm and the width is 1 mm. Further, it is desirable for the slot 212 formed from the inlet unit 200 to the first feeding portion 220 to extend to the second feeding portion 230. For example, in this case, the slot 212 provided to the second feeding unit 230 is formed at a position where the six slots 222 are divided into three each. That is, the portion of the second feeding unit 230 on the side of the first feeding unit 220 is formed with both two slots 212 and six slots 222. With this configuration, the SPR enters from the inlet unit 200, and when the portion divided into 2 (slots 212) on the upstream side is opened, the action of closing the claw portion divided into 6 (slots 222) on the downstream side from the second feeding portion 230 to the outlet unit 240 becomes easier to work. In addition to this action, by making the number of slots 222 on the downstream side larger than the number of slots 212 on the upstream side, as well as by forming the length of the claw portion split into 6 (slots 222) on the downstream side longer than the length of the portion split into 2 (slots 212) on the upstream side, it is also possible to make the work easier.

The second feeding unit 230 is made thinner than the inlet unit 200 and the first feeding unit 220 so as to be narrowed down to have elasticity.

The outlet unit 240 is configured to support when fastening the SPR fed from the second feeding unit 230. The outlet unit 240 is drawn in the same manner as the inlet unit 200, and the SPR cannot pass through the outlet unit 240 unless the SPR is pressed by the punch 102.

By making the outlet unit 240 thicker than the second feeding portion 230, when the SPR passes through, a structure is taken so that the gap with the inner diameter of the nose piece 104 that covers the outside is reduced to avoid spreading more than is necessary.

The slot 212 of the inlet unit 200 is drawn, and the splitting width is narrower than that of the first feeding portion 220. Further, the slot 222 of the outlet unit 240 is also drawn, and the splitting width is narrower than that of the slot 222 of the second feeding unit 230. With this configuration, in the inlet unit 200 and the outlet unit 240, the inlet unit 200 expands when the SPR passes through the inlet unit 200; therefore, the outlet unit 240 is narrowed so that sufficient tension is applied to the SPR from the outside to stably hold the SPR.

As described above, by forming respective slots on the upstream side and the downstream side of the collet 100, it has a structure so that when the SPR passes through the collet 100, an appropriate tension is applied while always maintaining the direction of the SPR regardless of the position. Therefore, it is possible to load up to the outlet unit 240 of the collet 100 while maintaining the vertical direction of the SPR.

In this embodiment, assuming that the material has high rigidity, the upstream side slots 212 are set to 2 and the downstream side slots 222 are set to 6. The number of slots may be increased; for example, the number of slots 212 may be 4 and the number of slots 222 may be 8. In this case, for example, the material may be resin, or the like. By constructing a structure that increases the number of slots in this way, it is possible to feed the SPR more smoothly while giving stable tension to the inside as compared with the conventional 2 slots.

As described above, this embodiment takes a structure so that it is difficult for the SPR to reverse by suppressing the expansion of the tip diameter of the collet 100. Further, a structure is taken so that each of the slots 212 and 222 applied to the collet 100 does not extend in the entire axial direction of the collet 100 and can be manufactured by integral molding. The conventionally required O-ring is no longer required.

Figure 5:
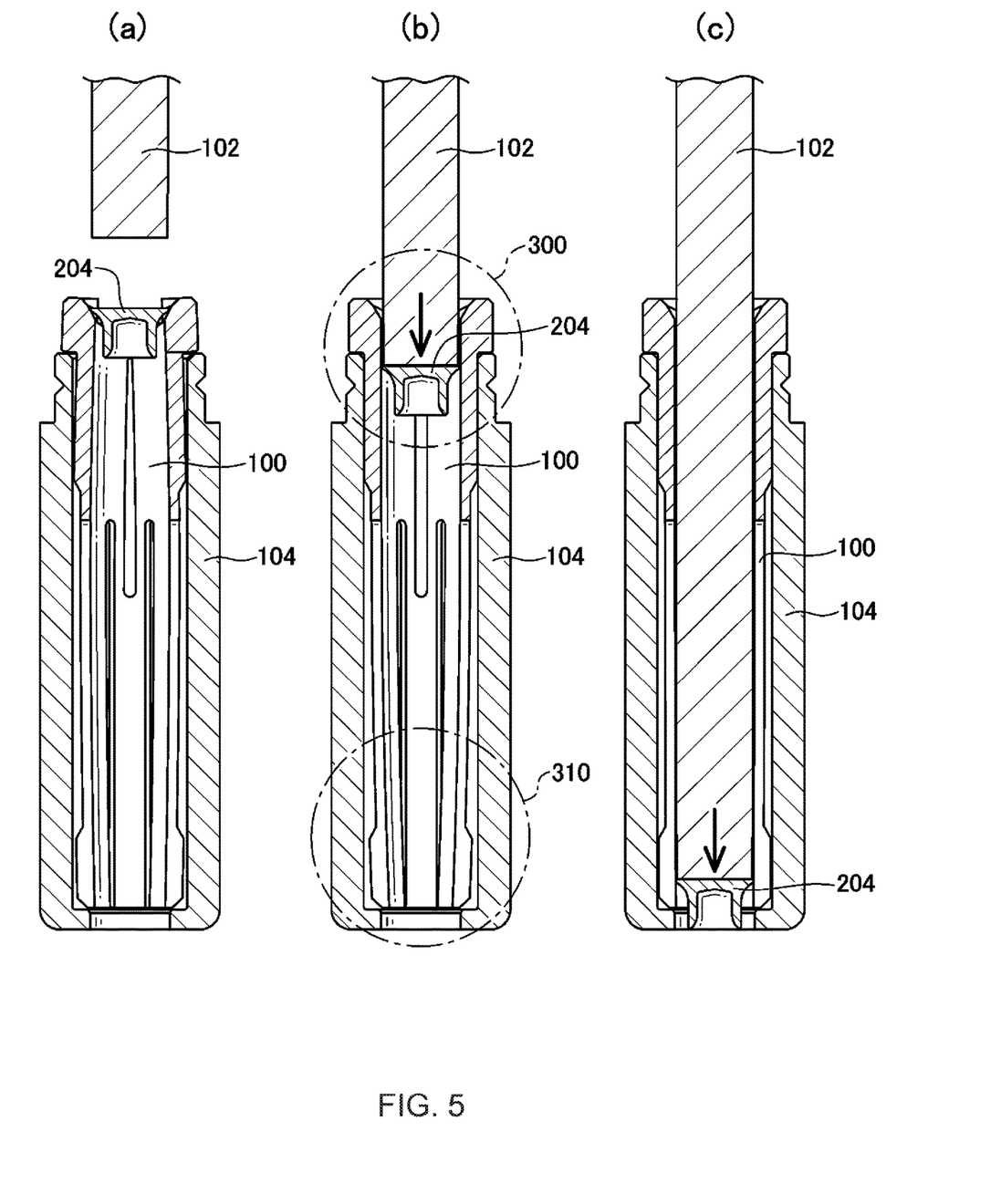
FIG. 5 is a diagram showing a state of feeding SPR204 using the collet 100 according to one embodiment.

FIG. 5 is a diagram showing the state of feeding SPR204 using the collet 100 according to one embodiment.

FIG. 5A shows a situation in which the SPR 204 fed from the receiver 101 is held at the inlet unit 200. In this situation, since the outer diameter of the flange portion of the SPR is larger than the inner diameter of the inlet unit 200, the SPR 204 can be held at the inlet unit 200.

FIG. 5B shows a situation in which the SPR 204 is pressed downward by the punch 102 and reaches the first feeding unit 220. In this situation, when SPR204 is pushed out by the punch 102, the upper portion divided into 2 (slots 212) of the collet 100 is opened, and the lower portion divided into 6 (slots 222) is closed. Reference numeral 300 in FIG. 5B indicates a situation in which the upper portion divided into 2 (slots 212) is open, and reference numeral 310 indicates a situation in which the lower portion divided into 6 (slots 222) is closed. In this way, by separately having the upper part and the lower part slots, the structure is such that the tension is appropriately applied while always maintaining the direction of the SPR.

FIG. 5C shows a situation in which the SPR 204 is pushed further downward by the punch 102, passes through the first feeding unit 220 and the second feeding unit 230, and reaches the outlet unit 240. In this situation, as the SPR204 passes, the outlet unit 240 divided into six parts (slots 222) is thickly formed so as to be opened as far as the inner diameter of the nose piece 104. It is possible to load up to the outlet unit 240, which is the tip of the collet 100, while maintaining the vertical orientation of the SPR204, and fastening using SPR204 is possible. As described above, since the outlet unit 240 of the collet 100 is arranged inside the nose piece 104 that functions as the case of the collet 100, when SPR204 reaches the outlet 240, the radial outer surface of the outlet 240 abuts the inner surface of the nose piece 104 and cannot extend beyond it, the SPR204 can be supported so as not to be inverted in the outlet unit 240, and the centering of the SPR204 at the time of fastening can be ensured.

Embodiments and working examples of the collet for feeding and fastening the SPR according to the present invention have been described above; however, it will be easily understood that the present invention is not limited to the above-described embodiments, and various modifications can be made thereto. In addition, as long as they are within the scope of matters described in the respective claims and equivalent matters, they are naturally included in the technical scope of the present invention. In the above embodiment, the object to be fed is an SPR, but this is only an example, and the present invention is not limited to this specific example.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A rivet fastening device used to feed and fasten a cylindrical rivet, the rivet fastening device comprising:
    an inlet unit that accepts and supports the rivet, the inlet unit defining a first outer diameter;
    a first feeding unit connected to the inlet unit and configured to feed the rivet;
    a second feeding unit connected to the first feeding unit on a side opposite to the inlet unit and configured to feed the rivet;
    an outlet unit that is connected to the second feeding unit on a side opposite to the first feeding unit and supports the rivet that is fed from the second feeding unit;
    wherein the first outer diameter is greater than an outer diameter defined by any of the first feeding unit, the second feeding unit, and the outlet unit;
    the inlet unit and the first feeding unit include at least two of a first slot disposed radially opposite to one another;
    the second feeding unit and the outlet unit include a larger number of a second slot than the number of first slots of the inlet unit and the first feeding unit, and
    wherein the device is configured such that when the rivet is fed from the inlet unit and enters the first feeding unit, the second slots are closed by the opening of the first slots.

2. The rivet fastening device according to claim 1, wherein the first slots extend to the second feeding unit.

3. The rivet fastening device according to claim 1, wherein a second wall thickness of the second feeding unit is thinner than a first wall thickness of the first feeding unit.

4. The rivet fastening device according to claim 1, wherein an outlet wall thickness of the outlet unit is thicker than a second wall thickness of the second feeding unit.

5. The rivet fastening device according to claim 1, wherein a length of the second slots is longer than a length of the first slots.

6. The rivet fastening device according to claim 1, wherein the number of the first slots is two, and the number of the second slots is six.

7. The rivet fastening device according to claim 1, wherein the inlet unit has a narrower slot width than the first feeding unit, and the outlet unit has a narrower slot width than the second feeding unit.

8. The rivet fastening device according to claim 1, wherein the inlet unit, the first feeding unit, the second feeding unit and the outlet unit are integrally formed.

9. The rivet fastening device according to claim 1 and further comprising an outer case, and at least the outlet unit is arranged inside the case, and the device is configured such that when the rivet is located within the outlet unit, the second slots of the outlet unit expand and the outlet unit expands radially outward and abuts an inner surface of the case.

10. A rivet fastening system used to feed and fasten a cylindrical rivet fed from a source, the rivet fastening system comprising:
    a receiver defining an axial through passage and operable for accepting the rivet fed radially onto the through passage from the source;
    a punch holder connected to a first axial side of the receiver;
    a punch supported and axially aligned by the punch holder and operable for axial movement within the through passage;
    a nosepiece connected to a second axial side of the receiver;
    a collet located within the nosepiece and coaxially aligned with the through passage and the nosepiece, the collet including a wall having a first end proximal to the receiver and a second end distal from the receiver, the wall partially defining an axial through bore open at the first end and the second end, and the wall including:
    an inlet portion axially proximal to the receiver;
    a first feeding portion connected to the inlet portion axially opposite to the receiver;
    a second feeding portion connected to the first feeding portion axially opposite to the inlet portion;
    an outlet portion connected to the second feeding portion axially opposite to the first feeding portion;
    at least two of a first slot partially defined by the wall, the first slots radially opposite to each other and axially extending through the inlet portion and into first feeding portion from a first open end at the first end of the collet to a first closed end at a first length;
    a number of a second slot greater than the number of the first slots, the second slots partially defined by the wall, the second slots axially extending through the outlet portion and into the second feeding portion from a second open end at the second end of the collet to a second closed end at a second length; and
    wherein the collet is configured such that when the rivet is fed from the inlet portion and enters the first feeding portion the second slots are closed by the opening of the first slots.

11. The rivet fastening system according to claim 10, wherein the first slots extend axially through the first feeding portion and into the second feeding portion.

12. The rivet fastening system according to claim 10, wherein a second wall thickness of the second feeding portion is thinner than a first wall thickness of the first feeding portion.

13. The rivet fastening system according to claim 10, wherein an outlet wall thickness of the outlet portion is thicker than a second wall thickness of the second feeding portion.

14. The rivet fastening system according to claim 10, wherein the second length of the second slots is longer than the first length of the first slots.

15. The rivet fastening system according to claim 10, wherein the number of the first slots is two, and the number of the second slots is six.

16. The rivet fastening system according to claim 10, wherein, when the collet is in a relaxed state without a rivet inside, a first width of the first slots narrows from the first closed end toward the first open end and a second width of the second slots narrows from the second closed end toward the second open end.

17. The rivet fastening system according to claim 10, wherein the inlet portion, the first feeding portion, the second feeding portion and the outlet portion are integrally formed.

18. The rivet fastening system according to claim 10, and when the rivet is located within the outlet portion, the second slots expand and the outlet portion expands radially outward and abuts an inner surface of the nosepiece.

* * * * *